United States Patent
Ancona et al.

(10) Patent No.: US 6,532,864 B2
(45) Date of Patent: Mar. 18, 2003

(54) COMBINATION SLICER/TOASTER

(75) Inventors: Bruce Ancona, Chicago, IL (US); Robert A. Varakian, Chicago, IL (US)

(73) Assignee: Lectrix, LLC, Edgewater, NJ (US)

( * ) Notice: Subject to any disclaimer, the term of this patent is extended or adjusted under 35 U.S.C. 154(b) by 0 days.

(21) Appl. No.: 09/810,023

(22) Filed: Mar. 16, 2001

(65) Prior Publication Data

US 2001/0029823 A1 Oct. 18, 2001

Related U.S. Application Data

(60) Provisional application No. 60/193,634, filed on Mar. 31, 2000.

(51) Int. Cl.$^7$ ................................................. A47J 37/08
(52) U.S. Cl. ............................. 99/357; 99/389; 99/391; 99/385; 99/400
(58) Field of Search .......................... 99/389, 385, 391, 99/386, 357, 400

(56) References Cited

U.S. PATENT DOCUMENTS

| | | | |
|---|---|---|---|
| 1,217,717 A | | 2/1917 | Decker et al. |
| 2,042,226 A | * | 5/1936 | Harpster ...................... 99/389 |
| 2,095,620 A | | 10/1937 | Tuthill et al. |
| 2,545,404 A | * | 3/1951 | Young .......................... 99/400 |
| 2,552,135 A | | 5/1951 | Bertino |
| 2,948,312 A | | 8/1960 | Rothrock |
| 4,048,883 A | | 9/1977 | Lecrone |
| 4,589,315 A | | 5/1986 | Clement |
| 5,099,979 A | | 3/1992 | Kehrel |
| 5,167,177 A | | 12/1992 | Cimperman et al. |
| 5,404,782 A | | 4/1995 | Ryans et al. |
| 5,522,306 A | | 6/1996 | DeMars |
| 5,673,608 A | | 10/1997 | DeMars |
| 5,690,013 A | | 11/1997 | Kanarek et al. |
| 5,921,163 A | | 7/1999 | McInnes et al. |
| 6,177,654 B1 | * | 1/2001 | Schackmuth .............. 99/386 X |

* cited by examiner

Primary Examiner—Reginald L. Alexander
(74) Attorney, Agent, or Firm—Cowan, Liebowitz & Latman, P.C.; Mark Montague

(57) ABSTRACT

A combination slicer and toaster which is particularly suitable for slicing and toasting bagels and other similar food items, which comprises in combination a slicing section and a toasting section, such that a bagel, or other similar food item, is inserted into an opening slot in one end of the slicing section, wherein said bagel or other food item is forced into intimate contact with a slicer located within the slicing section by the downward action of a pusher located in rotational contact with the opening slot. Upon passing through the slicing section, the bagel is simultaneously deposited in the toasting section of the device, where the now sliced food item is toasted and, upon completion of the toasting operation, is elevated through an exit slot in the other end of the device.

5 Claims, 4 Drawing Sheets

COMBINATION SLICER/TOASTER

RELATED APPLICATION

This application claims the benefit of U.S. Provisional Application No. 60/193,634, filed Mar. 31, 2000.

FIELD OF THE INVENTION

The present invention relates generally to kitchen appliances. More particularly, the invention relates to a combination slicer and toaster which is designed to accomplish the tasks of slicing and subsequent toasting of bagels and other similar food items in one continuous operation.

BACKGROUND OF THE INVENTION

While numerous slicing devices and toasters are known in the art which are effective to a greater or lesser degree to slice and then toast bagels and other similar food items in separate steps, nowhere is there any device disclosed or taught which is capable of carrying out both of these steps in one simple and efficient operation, without the need for intervention by the user between the slicing step and the toasting step. It has therefore been deemed advantageous to provide a combination slicer/toaster to simplify this task for the user.

A number of prior art references available in the art are known, each reference being directed to some specific discreet elements of the device which is described and claimed in the present invention. However, none of the references is directed to the totality of the combination, or its use and function in the manner described and claimed herein.

The following prior art references are known:

McInnes et al., U.S. Pat. No. 5,921,163 discloses a bagel slicer appliance utilizing a motorized cutting element within a housing containing a reciprocating knife into which housing a bagel is inserted and the knife cuts therethrough;

Kanarek et al., U.S. Pat. No. 5,690,013 discloses another automatic bagel slicer;

DeMars, U.S. Pat. No. 5,522,306 discloses a combined toaster and cutter appliance. A bagel can be placed into a container where a cutting blade is activated to slice the bagel, which is thereafter toasted in the toasting chamber; and DeMars, U.S. Pat. No. 5,673,608 discloses another toaster and bagel slicer combination having a removable slicer device.

OBJECTS OF THE INVENTION

It is therefore an object of the invention to provide a combination slicer/toaster device useful for carrying out the slicing and toasting of bagels and other similar food items.

It is also an object of the present invention to provide for carrying out the steps of slicing and toasting bagels and other similar food items in one continuous operation.

It is a further object of the present invention to provide a combination slicer/toaster device for carrying out the steps of slicing and toasting bagels and other similar food items in one continuous operation without the need for intervention by the user between the slicing and toasting steps.

These and other objects of the invention will become apparent from the following discussion of the invention.

SUMMARY OF THE INVENTION

The present invention provides for a combination slicer and toaster, which is particularly suitable for slicing/toasting bagels and other similar food items. The slicer/toaster of the invention comprises in combination a slicing section and a separate toasting section, such that a bagel, or other similar food item, is inserted into an opening slot in one end of the slicing section. Said bagel, or other similar food item, is forced into intimate contact with a slicing means located within the slicing section by the downward action of a pusher means, which pusher means is located in rotational contact with the opening slot. Upon passing through the slicing section the bagel, or other similar food item, is deposited in the toasting section of the device where the now sliced food item is toasted and, upon completion of the toasting operation, is elevated through an exit slot in the other end of device.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

The present invention is directed to a combination slicer and toaster, which is particularly suitable for slicing and toasting bagels and other similar food items. The slicer/toaster of the invention comprises in combination a slicing section and a toasting section, such that a bagel, or other similar food item, is inserted into an opening slot in one end of the slicing section, wherein said bagel, or other similar food item is forced into intimate contact with a slicing means located within the slicing section by the downward action of a pusher means, which pusher means is preferably located in rotational contact with the opening slot. Upon passing through the slicing section, the slices of the bagel or other similar food item are simultaneously deposited in the toasting section of the device where the food item slices are toasted and, upon completion of the toasting operation, are elevated through an exit slot in the other end of the device.

Figure 1:
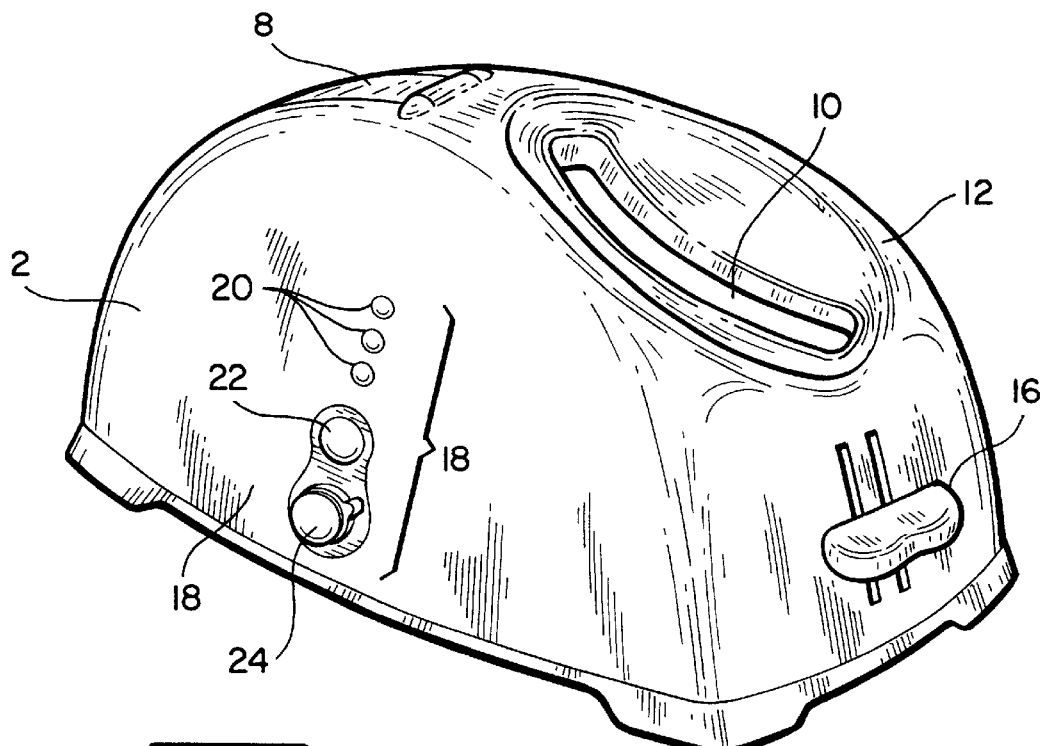
FIG. 1 is a front perspective view of an embodiment of the combination slicing/toaster device of the present invention.
Figure 2:
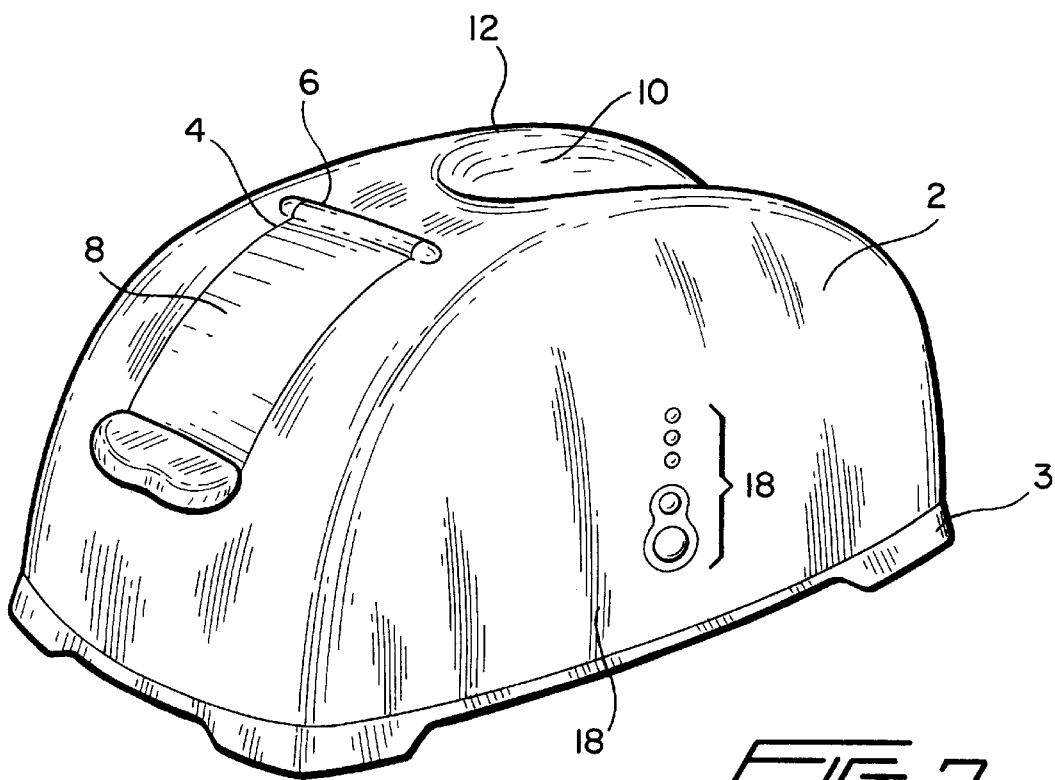
FIG. 2 is a rear perspective view of an embodiment of the combination slicing/toaster device of the present invention.

The invention can perhaps be better appreciated from the drawings. In FIGS. 1 and 2, which are front and rear prospective views of a combination slicing/toasting device according to a preferred embodiment of the present invention, the device generally includes a main housing 2 which is formed as a generally streamlined enclosure having rounded corners and a rectangular base 3. Housing 2 is provided with an opening slot 4, which has affixed at one end 6 of opening slot 4 a pusher element 8, which generally corresponds to the dimensions (width and length) of opening slot 4. Housing 2 is also provided with an exit slot 10 at the upper surface 12 of housing 2 opposite from opening slot 4. The end 14 of housing 2 closest to exit slot 10 has an actuator 16 which operates to lower or raise a food item that has been or will be toasted.

Lateral surface 18 of housing 2 has a control section 18 having one or more control knobs, buttons, or dials. In the embodiment shown in FIG. 1, control section 18 comprises heat control knobs 20, an indicator light 22, and a toast control knob 24.

Figure 3:
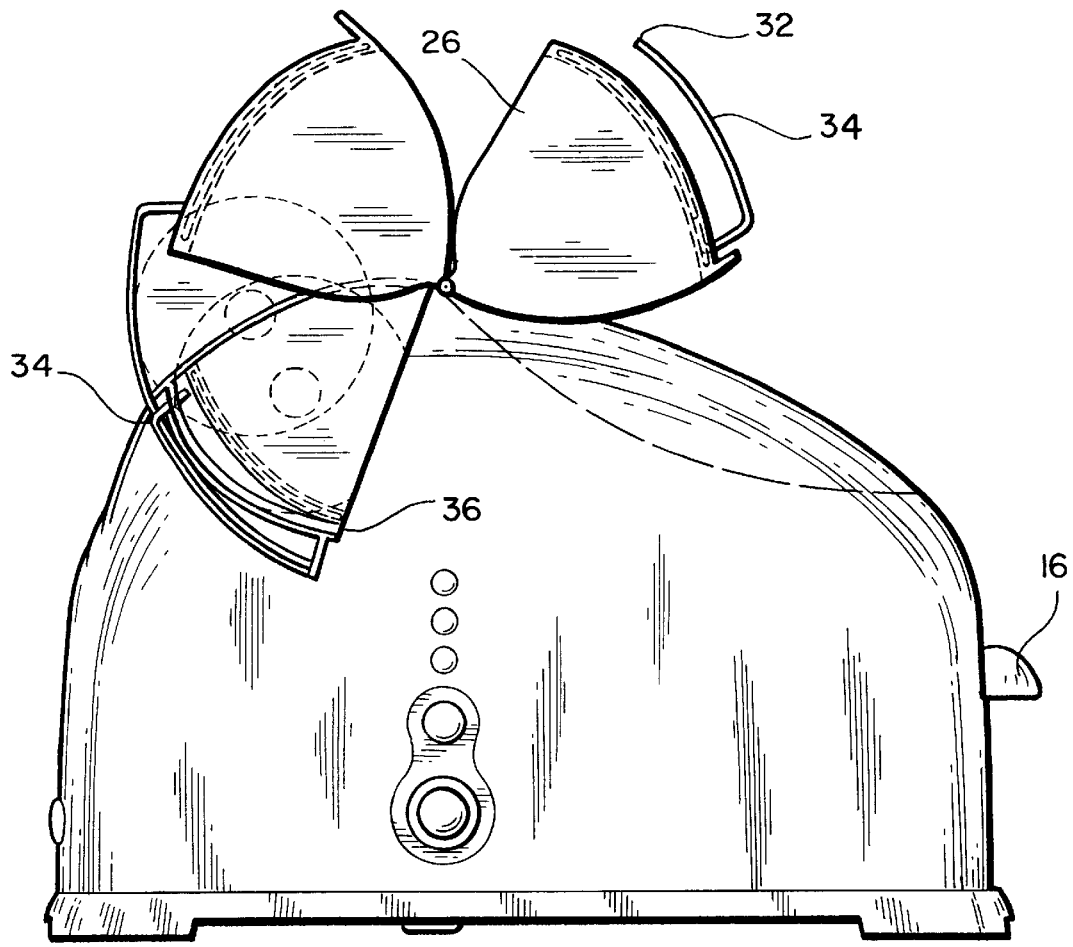
FIG. 3 is a side elevational view of an embodiment of the combination slicing/toaster device of the present invention.

FIG. 3 is a side elevational view of another preferred embodiment of the combination slicing/toasting device of the present invention. Pusher element 8 (shown in three positions) can be rotated around end 6 to permit access to opening slot 4 by bagel 26 which is pushed to contact slicing blade 28 (shown in FIG. 5A). Upon passing through the slicing section of the device, the bagel or food item is simultaneously deposited in the toaster section of the device, whereafter a toasted bagel or food item is lifted out of exit slot 14. Pusher element 8 is affixed within opening slot 4 and rotates about pivot 38.

Pusher element 8 preferably has a wedge section 29 and a protruding portion 30, that has two functions: First, the distal end 32 of protruding portion 30 activates a switching mechanism 34 to engage slicing blade 28. And second, when distal end 32 touches stop 36, the movement of wedge section 29 is stopped short of slicing blade 28. Optional stop 36 operates to disengage or "turn off" slicer blade 28.

Pusher element 8 is dimensioned such that it may be depressed within opening slot 4 to ensure the compression of a food item against and past slicing blade 28. The lateral edges of pusher element 8 may be provided with grooves or projections that correspond to the reciprocal projections or grooves, respectively, to guide pusher element 8 uniformly within the opening slot.

Figure 4:
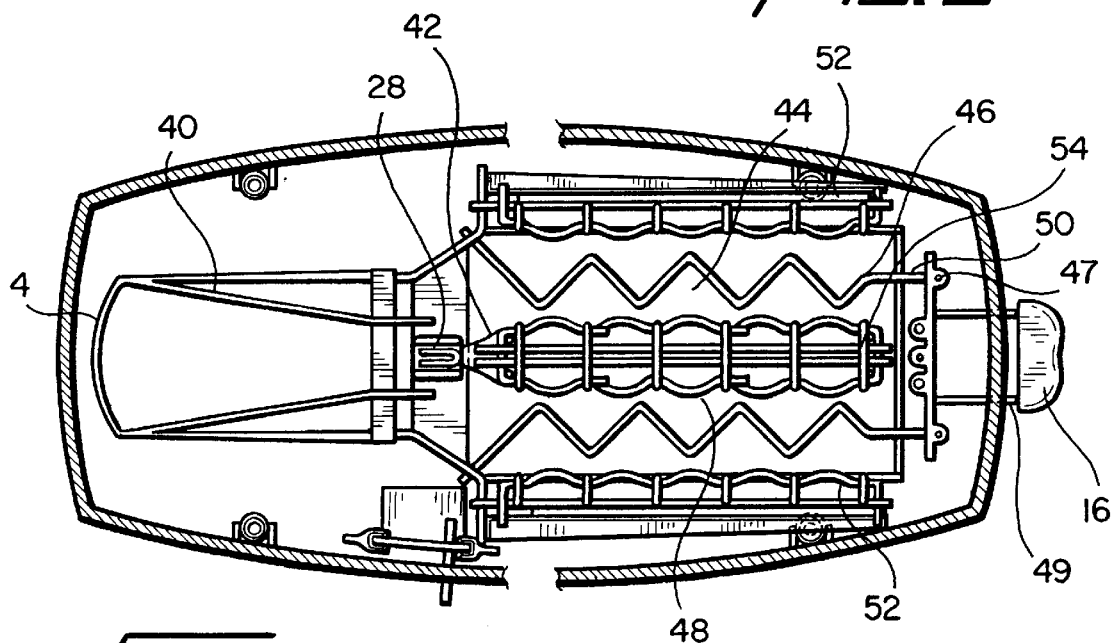
FIG. 4 is a top, somewhat cross-sectional schematic view of a preferred interior arrangement for the components of an embodiment of the combination slicer/toaster device of the present invention.

FIG. 4 is a top schematic view of a preferred interior arrangement for the components of a preferred embodiment of the combination slicer/toaster device of the present invention. The interior of opening slot 4 is defined by plates 40 located on either side of the interior of opening slot 4, which plates 40 generally orientate the food item to be sliced in a centered position relative to slicing blade 28. Immediately adjacent to slicing blade 28 is a wedge-shaped member 42, which serves to channel food item slices into the toaster section 44 where each sliced food item slice is contacted by a wire mechanism 46 which serves to raise and lower the food item slices. One side of each food item slice contacts stationary wire guides 48, and the other side of each food item contacts wire guides 45, described in more detail below. One end 50 of wire mechanism 46 is operationally connected by plate 47 and through slot or slots 49 to actuator 16.

Upon being deposited upon wire mechanism 46, the food item slices are generally positioned in parallel orientation to inner heating coil 52 and outer heating coils 54. Control electronics 56 for duration/intensity of heat to be applied are also located within housing 2, for example, adjacent to slicing blade 28 and preferably separated by insulation 58 from heating coils 28.

Figure 5A:
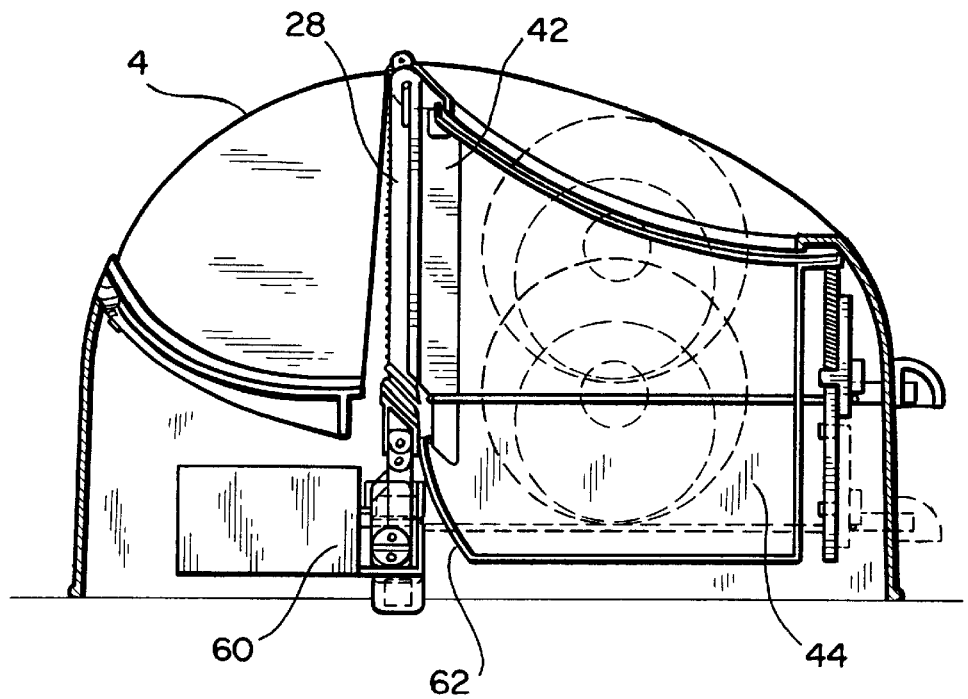
FIGS. 5A and 5B are each a lateral, somewhat cross-sectional schematic view of the interior arrangement of components of the embodiment depicted in FIG. 3.
Figure 5B:
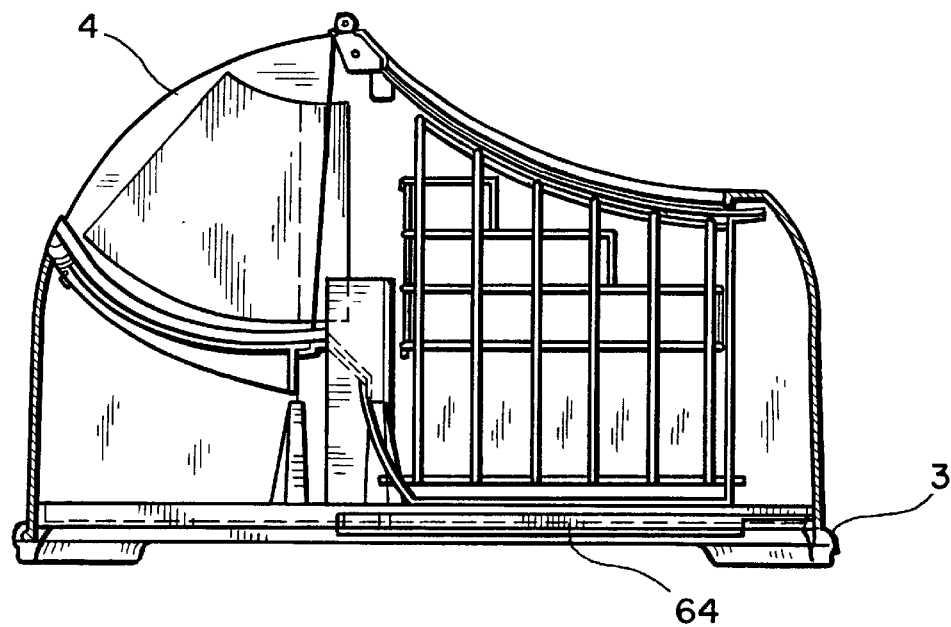

FIGS. 5A and 5B are each a somewhat cross-sectional, lateral schematic view of the interior arrangement of components of the embodiment depicted in FIG. 3. The relative positioning of opening slot 4 and slicing blade 28 are shown with relationship to wedge-shaped member 42. Slicing blade 28 is operatively connected to a motor and gearing means 60 which serves to move slicing blade 28 in an up and down motion.

As shown in FIG. 5A, a sloped surface 62, made, for example, from aluminum, directs the food item slices toward the bottom center of toasting section 44. Also, a slidable/ removable deep crumb tray 64 in base 3 catches crumbs but keeps them sufficiently far from heating coils 52, 54.

Figure 6:
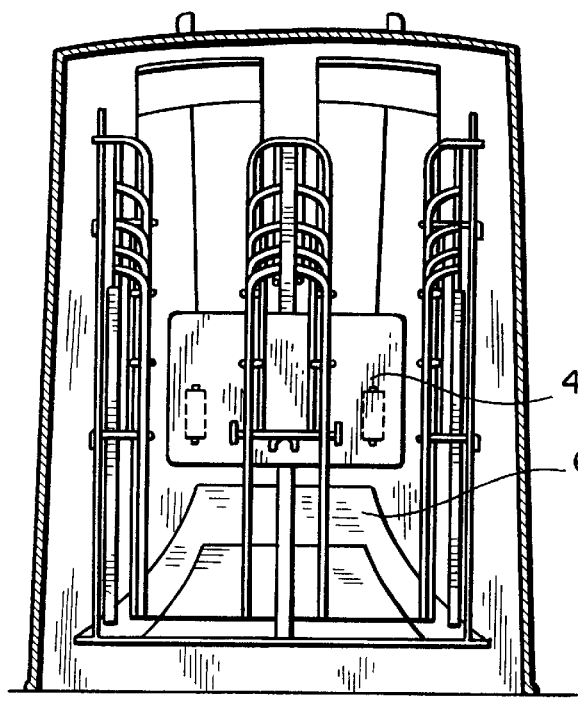
FIG. 6 is a front, somewhat cross-sectional schematic view of the interior components of the embodiment depicted in FIG. 3.
Figure 7B:
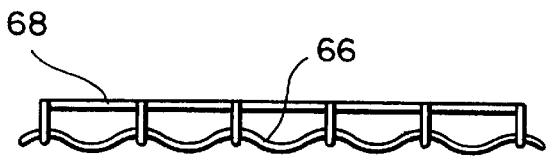
FIG. 7B is a top schematic view of the preferred embodiment depicted in FIG. 7A.
Figure 7C:
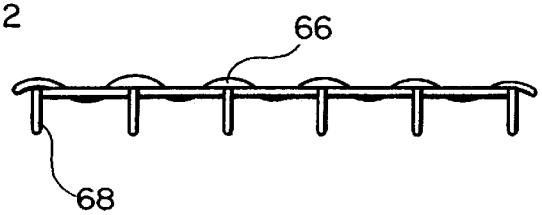
FIG. 7C is another top schematic view of the preferred embodiment depicted in FIG. 7A with the horizontal and vertical support wires in an alternate position.
Figure 7A:
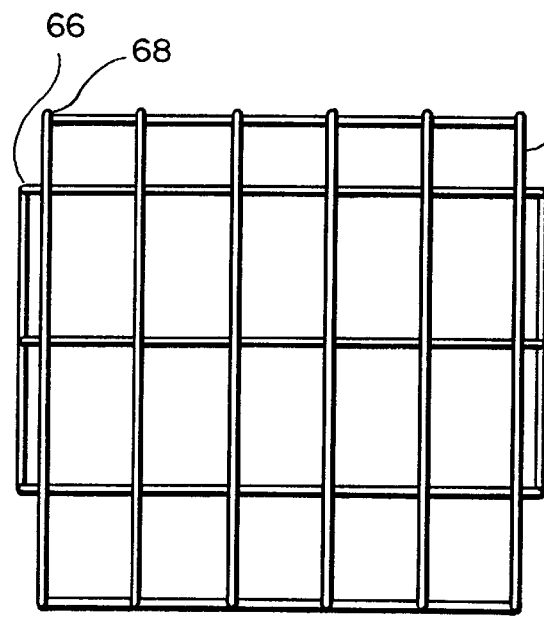
FIG. 7A is a front view of one preferred embodiment of the interior horizontal and vertical support wires for use in the toaster section of the device of the present invention.
Figures 7D, 7E:
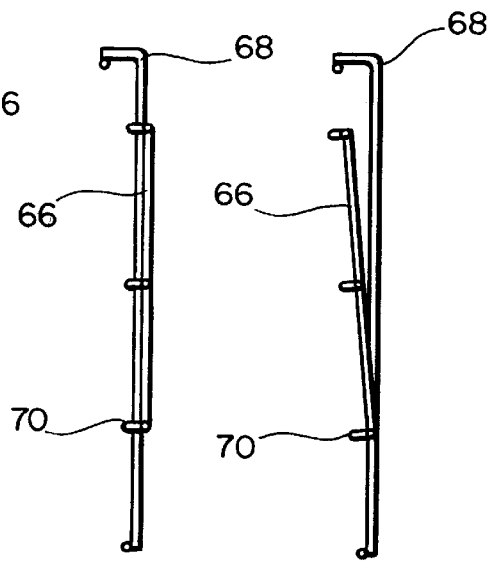
FIG. 7D is a side elevational view of the support wires in the position shown in FIG. 7B.
FIG. 7E is a side elevational view of the support wires in the position shown in FIG. 7C.

FIG. 6 is a front schematic view of the interior components depicted in FIG. 4. Inner heating coil 52 and outer heating coils 54 are positioned in general parallel orientation to wire mechanism 46.

FIGS. 7A–7E are perspective, top and side views of a preferred embodiment of the interior horizontal and vertical wire guide 45 for use in the toaster section of the device of the present invention. Each wire guide 45 comprises a set of interlocking members, namely, vertical member 66 and horizontal member 68. When a sliced bagel or food item enters toasting section 44, members 66 and 68 are configured as in FIGS. 7B and 7D, wherein the wires of horizontal member 68 are exposed to and contact the food item slices. Then, when the bagel or food item is toasted or is to be removed, vertical member 66 pivots forward about pivot 70 so that its wires contact the food item slices and guide them as actuator 16 and wire mechanism 46 lift up.

It will be further apparent to one skilled in this art that the improvements provided for in the present invention, while described with relation to certain specific physical embodiments also lend themselves to being applied in other physical arrangements not specifically provided for herein, which are nonetheless within the spirit and scope of the invention taught here.

What is claimed is:

1. A combination slicer and toaster device, particularly suitable for slicing and toasting bagels and other similar food items, comprising:

a slicing section having slicing means for slicing a food item to produce slices;

a toaster section having heating coils;

an opening in an end of the device for receiving a food item; the food item being deposited in the opening in said end of the device, passing over the slicing means and being simultaneously deposited in the toaster section for exposure to the heating coils; and a pusher means for forcing the received food item in intimate contact with the slicing means in the slicing section and for depositing the produced slices within the toaster section.

2. A device according to claim 1, further comprising a plurality of heating coils within the toaster section.

3. A device according to claim 1, further comprising a crumb tray located within the toaster section.

4. A combination slicer and toaster device, particularly suitable for slicing and toasting bagels and other similar food items, comprising:

a slicing section having slicing means for slicing a food item to produce slices;

a toaster section having heating coils;

an opening in an end of the device for receiving a food item;

a pusher means for forcing the received food item in intimate contact with the slicing means in the slicing section and for depositing the produced slices within the toaster section; and a motor and gearing means to operate the slicing means.

5. A combination slicer and toaster device, particularly suitable for slicing and toasting bagels and other similar food items, comprising:

an opening in an end of the device for receiving a food item;

a slicing section having slicing means for slicing the received food item to produce slices;

a toaster section having heating coils and adapted to receive the slices produced in the slicing section; the food item being deposited in the opening in said end of the device, passing over the slicing means and being simultaneously deposited in the toaster section for exposure to the heating coils; and a wire mechanism for raising and lowering the slices within the toaster section.

* * * * *